(12) United States Patent
Cabaret et al.

(10) Patent No.: US 8,631,336 B2
(45) Date of Patent: Jan. 14, 2014

(54) DISPLAY SYSTEM FOR AN AIRCRAFT COCKPIT

(75) Inventors: Rémi Cabaret, Toulouse (FR); Jean-Sébastien Vial, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1141 days.

(21) Appl. No.: 12/110,022

(22) Filed: Apr. 25, 2008

(65) Prior Publication Data

US 2008/0307370 A1 Dec. 11, 2008

(30) Foreign Application Priority Data

Apr. 27, 2007 (FR) ...................................... 07 03068

(51) Int. Cl.
*G06F 3/00* (2006.01)

(52) U.S. Cl.
USPC ........... 715/761; 715/759; 715/856; 715/859; 701/3; 701/14

(58) Field of Classification Search
USPC ........................................ 715/761; 701/3, 14
See application file for complete search history.

(56) References Cited

U.S. PATENT DOCUMENTS

| 6,112,141 | A | 8/2000 | Briffe |
| 6,381,519 | B1 * | 4/2002 | Snyder ............................... 701/3 |
| 6,784,869 | B1 * | 8/2004 | Clark et al. .................... 345/156 |
| 7,693,615 | B2 * | 4/2010 | Chen et al. ......................... 701/3 |
| 7,849,410 | B2 * | 12/2010 | Chang ........................... 715/754 |

FOREIGN PATENT DOCUMENTS

| FR | 2 821 445 | 8/2002 |
| FR | 2 821 446 | 8/2002 |

OTHER PUBLICATIONS

Preliminary Search Report dated Jan. 24, 2008 w/ English translation.

* cited by examiner

*Primary Examiner* — Alvin Tan
(74) *Attorney, Agent, or Firm* — Dickinson Wright PLLC

(57) ABSTRACT

Disclosed is a display system for an aircraft cockpit. The display system includes a plurality of display devices, each of which comprises at least one viewing screen configured to display a display format, and a cursor management unit linked to each display device and configured for moving a cursor over sensitive objects on the viewing screens of the display devices. Each of the display devices includes a format display unit configured to determine the display format of an associated viewing screen; a cursor detection unit configured to detect the presence of the cursor on the associated viewing screen; a geographic determining unit, linked to the format display unit and cursor detection unit, and configured to determine current geographic position of the cursor on the associated viewing screen; a data transmission link that links the geographic determining unit to the data transmission network; and a display unit configured to display a characteristic signal representing the determined current geographic position of the cursor.

6 Claims, 4 Drawing Sheets

DISPLAY SYSTEM FOR AN AIRCRAFT COCKPIT

FIELD OF THE INVENTION

The present invention relates to a display system for an aircraft cockpit, particularly a transport airplane.

BACKGROUND OF THE INVENTION

Although not exclusively, the present invention applies more particularly to a head-down-type display system which can display navigation information, such as an electronic screen of the EIS (Electronic Instrument System) type or a control and display system (CDS). Such a control and display system is notably described in French patent application n° 01 02566 and in French patent application n° 01 02567.

Said display system is of the type comprising:
a plurality of display devices, each of which comprises at least one associated viewing screen; and
at least one cursor management means enabling a pilot of the aircraft to move at least one cursor which can be moved over said viewing screens, and enable a sensitive (interactive) object that is designated by this cursor, in order to have a particular function associated with this sensitive object executed.

In the display system disclosed by the abovementioned patent application n° 01 02566, some of the viewing screens are intended for a first pilot, particularly the navigating pilot, others are intended for a second pilot, particularly the copilot, and yet others are common to said first and second pilots.

To ensure great effectiveness, each pilot is normally free to display the formats that he wants on the various screens that are allocated to him, and at any time. For this, each display device comprises an electronic control panel enabling the pilot to configure the display produced on the corresponding viewing screen. Also, regarding the display relating to navigation, different display formats (hereinafter called "navigation formats") are normally available.

Also, because of the many possible display configurations, the displays implemented on the various display devices, even those that are intended for one and the same pilot, can vary widely. In particular:
certain modes can be oriented towards the north, others can be oriented in the heading of the aircraft, and yet others can be fixed according to a stored heading;
the display radii can be very different; and
the display contents can also be different, some displays possibly being intended for navigation and others reserved for a tactical symbol system, for example.

Such a usual display system presents a few drawbacks, and in particular:
the viewing screens intended for one and the same pilot can be geographically decorrelated even when they display a navigation format, and it can be very difficult for the pilot to geographically correlate two navigation formats before performing an interactive action (replanning the flight plan, analyzing the terrains around a drop zone, etc.); and
a lack of communication between two viewing screens that are intended, one for a first pilot and the other for the second pilot.

SUMMARY OF THE INVENTION

The object of the present invention is to remedy the abovementioned drawbacks. It relates to a display system for an aircraft cockpit, which makes it possible to show one and the same particular geographic point on navigation formats displayed on different viewing screens in order to remedy the abovementioned drawbacks.

To this end, according to the invention, said display system of the type comprising:
a plurality of display devices, each of which comprises at least one associated viewing screen which is able to display, as display format, at least one navigation format; and
at least one cursor management means enabling a pilot of the aircraft to move at least one cursor which can be moved over said viewing screens, and enable a sensitive object that is designated by this cursor,
is noteworthy in that it also comprises a data transmission network which interlinks the various display devices of said display system, and in that each of said display devices comprises, in addition to the associated viewing screen:
a first means for automatically determining the display format which is displayed on the associated viewing screen;
a second means for automatically detecting the presence of said cursor on the associated viewing screen;
a third means for automatically determining the current geographic position of the cursor on the associated viewing screen, when a navigation format is displayed and the presence of said cursor is detected;
a fourth means for transmitting, as necessary, this current geographic position to the other display devices of the display system, via said data transmission network; and
a fifth means which is activatable and which displays, when activated, at least one characteristic symbol on the associated viewing screen, if the latter does not contain said cursor and if it displays as display format a navigation format, said auxiliary symbol being positioned in said current geographic position.

Thus, thanks to the invention, the display system makes it possible to present, on all the viewing screens that are not provided with the cursor and that display a navigation format, at least one characteristic symbol which indicates the geographic position designated by the cursor. Also, if the pilot moves the cursor over a particular geographic position that he wants to highlight, for example a point that is of particular interest for the current mission, such as a drop point for an in-flight dropping mission or the position of a person or an appliance in a search and rescue mission, this position can be located on all the viewing screens that display a navigation format.

In the context of the present invention, the term navigation format is used to mean a particular display format comprising at least one distance scale making it possible to obtain a geographic location in a plane.

Advantageously, when the cursor is present on the associated viewing screen, said third means determines, as current geographic position, the latitude and the longitude of the geographic point which is designated by this cursor on the displayed navigation format.

In a preferred embodiment, at least some of said display devices are part of a first set which is intended for one and the same pilot of the aircraft, and each fifth means of said display devices of said first set is activated automatically, on receiving a current geographic position relating to the presence of the cursor on another viewing screen of said first set, and it displays, as appropriate, automatically, on the associated viewing screen, a first symbol as characteristic symbol.

In this preferred embodiment, the display of the characteristic symbol is produced automatically, which reduces the workload of the pilot. Furthermore, such a display enables the pilot to geographically correlate different navigation formats (whatever their configurations). This can be particularly useful before performing an interactive action such as a replanning of the flight plan or an analysis around a particular area of the terrain being flown over.

Furthermore, in a particular embodiment, at least some of said display devices are part of a first set which is intended for a first pilot (for example the navigating pilot) of the aircraft, at least certain others of said display devices are part of a second set which is intended for a second pilot (for example the copilot) of the aircraft, and each display device of a set also comprises a sixth means which enables a pilot to manually control the activation of the corresponding fifth means for it to display, as characteristic symbol, a second symbol illustrating the position of the cursor which is located on a viewing screen of the other set of display devices.

Thus, a pilot P1 can manually request the display of the position of the cursor used by the other pilot P2. This enables this other pilot P2 to flag a particular point of interest, for example the analysis of a tactical situation that is dangerous within the scope of the mission, without the pilot P1 being obliged to cross-refer to the screens of this pilot P2. All he actually needs to do is to look at one of his own screens, which is provided with a navigation format. This reduces the workload of the crew of the aircraft.

In this latter embodiment, preferably, the display system comprises at least two cursor management means, a first of which is used to manage a first cursor which is intended for said first set of display devices and is operable by said first pilot, and the second of which is used to manage a second cursor which is intended for said second set of display devices and is operable by said second pilot.

It may be that said first and second symbols are displayed simultaneously on one and the same viewing screen. Therefore, advantageously, to enable them to be clearly distinguished, said first and second symbols are displayed using different graphic representations, for example different shapes and/or colors.

BRIEF DESCRIPTION OF THE DRAWINGS

The figures of the appended drawing will clearly show how the invention can be implemented. In these figures, identical references denote similar elements.

DETAILED DESCRIPTION OF THE INVENTION

Figure 1:
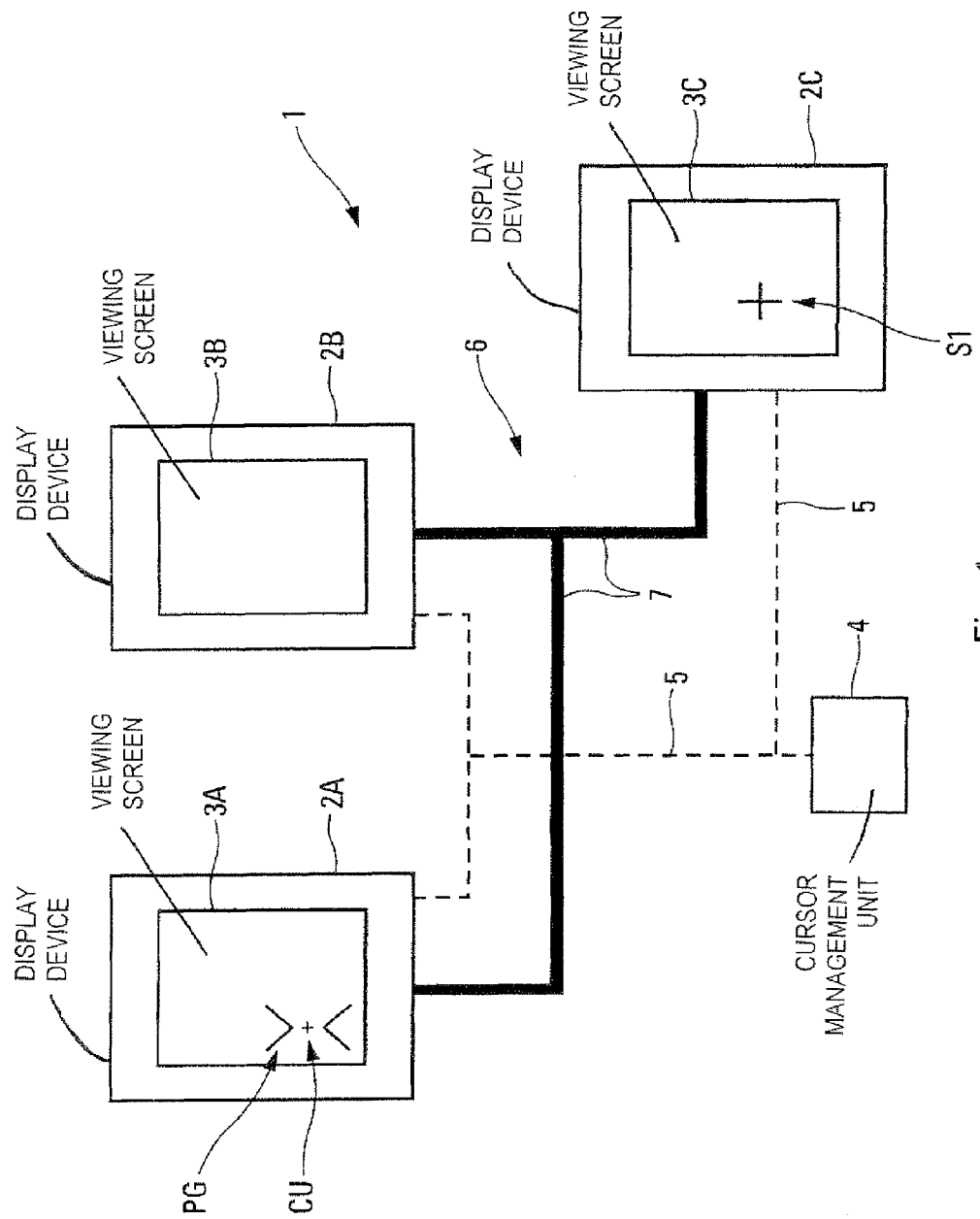
FIG. 1 is the block diagram of a display system according to the invention.

The display system 1 according to the invention and diagrammatically represented in FIG. 1 is intended to display information in a cockpit of an aircraft, in particular a transport airplane. Although not exclusively, this display system 1 is preferably a head-down-type display system.

Said display system 1 comprises:
a plurality of display devices 2A, 2B and 2C, each of which comprises at least one viewing screen, respectively 3A, 3B and 3C. Each of said viewing screens 3A, 3B and 3C is able to display, as display format, at least one navigation format; and
at least one standard cursor management means 4, which is linked via links 5 (represented by broken lines in FIG. 1) to each of the display devices 2A, 2B and 2C and which is constructed in such a way as to enable a pilot of the aircraft to move at least one cursor CU which can be moved over the viewing screens and enable a sensitive object that is designated by this cursor.

In the context of the present invention, a navigation format is considered to be a particular display format which comprises navigation information and which is provided with at least two distance scales making it possible to obtain a geographic location in a plane. Obviously, usually, some of said viewing screens of the system 1 can also display other types of display format, and in particular a piloting format presenting piloting information.

Preferably, the screens of the system 1 are of interactive type. In the context of the present invention:
the term "interactive screen" should be understood to mean a screen which comprises sensitive objects (points, lands, alphanumeric values, lists, menus, etc.) which are respectively associated with particular functions specified hereinbelow and which are sensitive to the presence of a cursor. Said cursor can be moved using the means 4 over a sensitive object in order to designate it or mark it. When a sensitive object is designated, that is, when the cursor is positioned on it, said sensitive object is marked or highlighted, in particular by a change of appearance such as a change of color or a highlight for example. Said sensitive object is then said to be provided with an "object marker" or "focus". Enabling (using the means 4) a sensitive object which is provided with such an object marker triggers the execution of a function which is associated with said sensitive object; and
the term "execution of a function" should be understood to mean in particular:
the implementation of a control of an element (engine, lighting, etc.) of the aircraft or of a particular action;
data input;
access to information pages on a screen; and/or access to information or additional actions without changing page.

According to the invention, said display system 1 also comprises a data transmission network 6, for example of AFDX type, which interlinks the various display devices 2A, 2B and 2C of the display system 1 via data transmission links 7.

Figure 2:
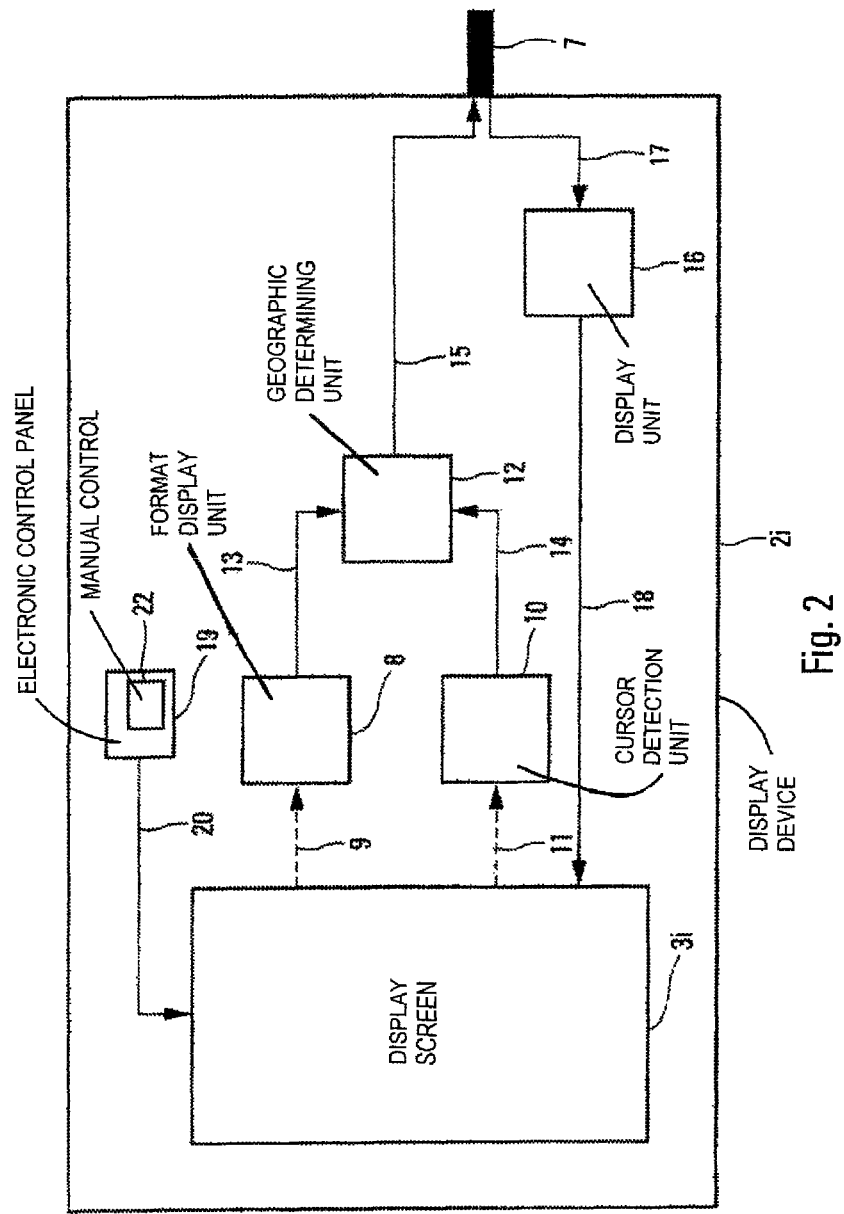
FIG. 2 is the block diagram of a display device forming part of a display system according to the invention.

Furthermore, each of the display devices of the system 1 comprises, in addition to the associated viewing screen, as represented by way of example for a display device 2i in FIG. 2 (i representing any one of the letters A to F):
a means 8 which can automatically determine the display format which is displayed on the viewing screen 3i, with which it is associated, as illustrated by a broken-line link 9;
a means 10 which can detect the presence of the cursor CU on the viewing screen 3i, with which it is associated, as illustrated by a broken-line link 11;
a means 12 which is linked respectively via links 13 and 14 to said means 8 and 10 and which is constructed in such a way as to automatically determine the current geographic position PG of the cursor CU on the associated viewing screen 3i, when both the means 8 has detected the display of a navigation format on the screen 3i and the means 10 has detected the presence of said cursor CU on this screen 3i;
an element 15, for example a data transmission link, which links the means 12 to a link 7 of said network 6 and which makes it possible to transmit, as necessary, this current geographic position PG to the other display devices of the display system 1, via said data transmission network 6; and a means 16 which is activatable and which displays, when activated, at least one characteristic symbol S1, S2 on the associated viewing screen, if the latter does not contain said cursor CU and if it displays as display format a navigation format. This auxiliary symbol S1, S2 is positioned on the viewing screen in said current geographic position PG of the cursor CU. For this, said means 16 is linked via a link 17 to said data transmission network 6 (to receive the geographic position PG) and via a link 18 to said associated screen 3i.

Preferably, each display device of the system 1 also comprises an electronic control panel 19, for example of DCP (Display Control Panel) type, which is linked via a link 20 to said associated screen 3i and which makes it possible to manage the context of this screen 3i.

Thus, thanks to the invention, the display system 1 makes it possible to present, on all the viewing screens that are not provided with the cursor CU and that display a navigation format, at least one characteristic symbol S1, S2 which indicates the geographic position PG designated by the cursor CU. Therefore, if the pilot moves the cursor CU to a particular geographic position PG that he wants to highlight, for example a point that is of particular interest for the current mission, such as a drop point for an in-flight dropping mission or the position of a person or an appliance in a search and rescue mission, this position can be located on all the viewing screens of the system 1 that display a navigation format.

When the cursor CU is present on the associated viewing screen 3i, said means 12 determines, as current geographic position PG, the latitude and the longitude of the geographic point which is designated by this cursor CU on the displayed navigation format.

Figure 3B:
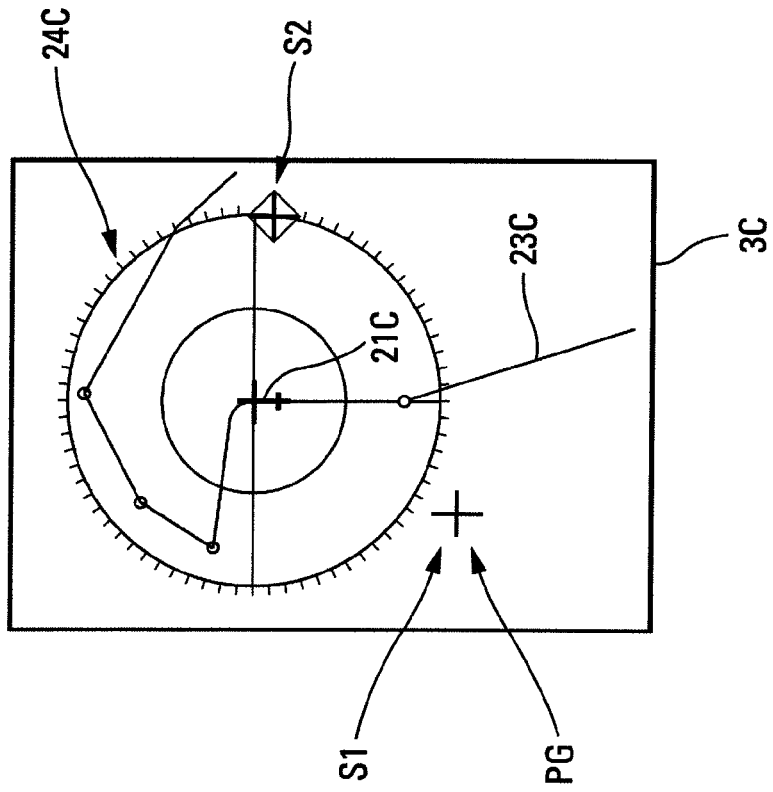
FIGS. 3A and 3B diagrammatically show two screens of a display system according to the invention, which clearly show the essential characteristics of the present invention.
Figure 3A:
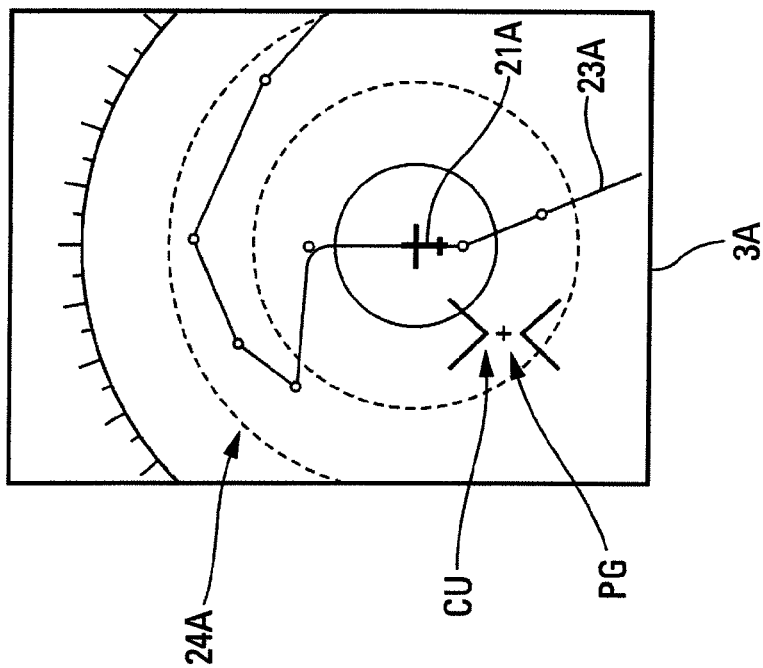

FIGS. 3A and 3B illustrate the display of a characteristic symbol S1, implemented using the invention. In FIG. 3A, which illustrates, for example, the viewing screen 3A, the cursor CU is positioned on a display format representing a navigation format. This cursor CU is moved to a position PG by a pilot of the aircraft via the means 4. FIG. 3B, which represents for example the screen 3C, illustrates another navigation format, on which is represented the characteristic symbol S1 which is located in the current geographic position PG which is designated by the cursor CU on the screen 3A. Since the (navigation) formats displayed on the screens 3A and 3B are different, for example presenting different scales, the geographic position PG is not located in the same position on these screens 3A and 3B. The displayed navigation formats include in particular a symbol 21A, 21C representing the aircraft, a plot 23A, 23C illustrating the route followed by the aircraft, and scales 24A, 24C.

It will be noted that, in the example of FIG. 1, no characteristic symbol is represented on the screen 3B, because it is assumed in this example that the screen 3B does not display a navigation format.

In the particular embodiment of FIG. 1, the display devices 2A, 2B and 2C are part of a display set which is intended for one and the same pilot of the aircraft. In this case, each means 16 of said display devices 2A, 2B and 2C of this display set is activated automatically, on receiving a current geographic position PG relating to the presence of the cursor CU on another viewing screen of said display set, and it displays, as appropriate, automatically, on the associated viewing screen, a symbol S1 as characteristic symbol.

In this particular embodiment, the display of the characteristic symbol S1 is produced automatically, which reduces the workload of the pilot. Furthermore, such a display enables the pilot to geographically correlate different navigation formats (whatever their configurations). This can be particularly useful before performing an interactive action such as a replanning of the flight plan or an analysis around a particular area of the terrain being flown over.

Figure 4:
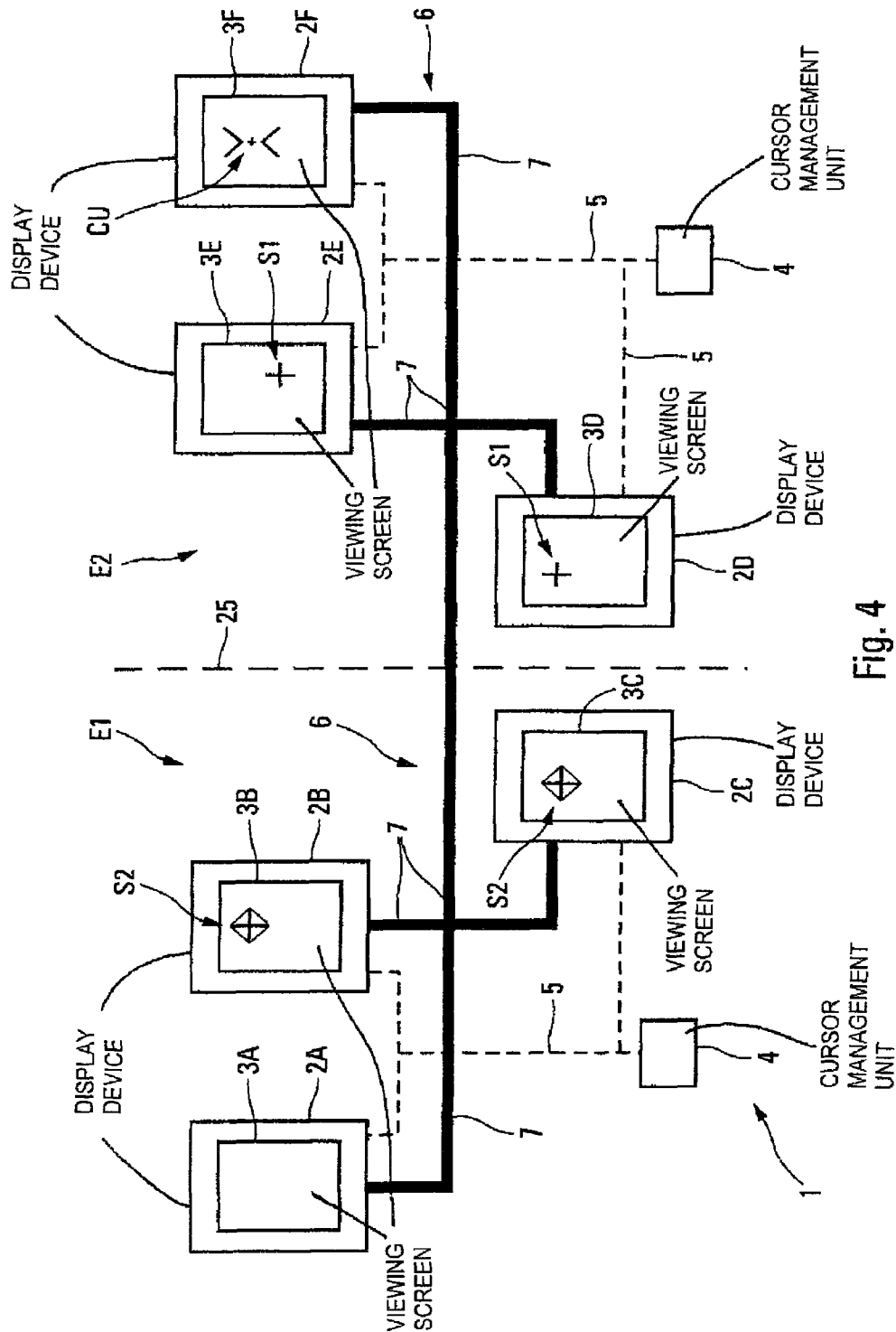
FIG. 4 is the block diagram of a particular embodiment variant of the display system according to the invention.

Furthermore, in the particular embodiment represented in FIG. 4, some of the display devices, namely the display devices 2A, 2B and 2C, are part of a first display set E1 which is intended for a first pilot of the aircraft, for example the navigating pilot, and the other display devices, namely the display devices 2D, 2E and 2F, are part of a second display set E2 which is intended for a second pilot of the aircraft, for example the copilot. This separation between the left-hand part (display set E1) intended for the first pilot and the right-hand part (display set E2) intended for the second pilot is highlighted by a hypothetical line 25 represented by broken lines in FIG. 4.

In this particular embodiment, each display device 2A to 2F is similar to the display device 2i of FIG. 2. Each of these display devices comprises, in addition to the means presented hereinabove, a means 22 which is, for example, incorporated in the electronic control panel 19 and which enables a pilot to manually control the activation of the corresponding means 16. In this particular embodiment, the activation of said means 16 leads to the display, as characteristic symbol, of a symbol S2 which illustrates the position of the cursor CU which is located on a viewing screen of the other set of display devices. In other words, the means 22 of a display device 2A, 2B, 2C of the set E1 can control the display of a symbol S2 which illustrates the position of the cursor CU on the other set E2, and vice versa.

Thus, a pilot P1 (the first or the second pilot) can manually request the display of the position of the cursor used by the other pilot P2 (the second or the first pilot). This enables this other pilot P2 to flag a particular point of interest, for example the analysis of a tactical situation that is dangerous in the scope of the mission, without the pilot P1 being obliged to cross-refer to the screens of this pilot P2. All that he actually needs to do is to look at one of his screens provided with a navigation format (and control the display of the symbol S2). This reduces the workload of the crew of the aircraft.

In the example of FIG. 4:
the cursor CU is located on the screen 3F of the set E2;
the corresponding symbols S1 are automatically displayed on the screens 3D and 3E of this set E2, which both display a navigation format; and
the symbols S2 are displayed, following a manual request, on the screens 3B and 3C of the set E1. For the screen 3A, either no display request has been made, or it displays a format other than a navigation format.

In this latter embodiment of FIG. 4, the display system 1 preferably comprises at least two cursor management means 4, a first of which is used to manage a first cursor which is intended for said display set E1 and is operable by said first pilot, and the second of which is used to manage a second cursor which is intended for said display set E2 and is operable by said second pilot.

In such a situation, it may be that said symbols S1 and S2 are displayed simultaneously on one and the same viewing screen, as represented by way of example in FIG. 3B for the viewing screen 3C. In this case, the symbol S1 is automatically displayed and indicates the position of the cursor on another viewing screen of the same set E1, and the symbol S2 is displayed following a request ordered by the pilot via the means 22 and indicates the position of the cursor on the other set E2. As represented in FIG. 3B, to enable them to be clearly distinguished, said symbols S1 and S2 are displayed using different graphic representations. These graphic representation differences can be produced using different shapes and/or different colors.

The invention claimed is:

1. A display system for an aircraft cockpit, said display system comprising:
   a plurality of display devices, each of which comprises at least one associated viewing screen configured to display a display format;
   at least one cursor management unit linked to each display device and configured for moving at least one cursor over said at least one viewing screen of each display device, and position the at least one cursor over a sensitive object on at least one viewing screen of the plurality of display devices, with the sensitive object being triggerable to execute an associated object function; and
   data transmission network which interlinks the plurality of display devices,
   wherein each display device comprises:
   i) format display unit configured to determine the display format of the at least one associated viewing screen,
   ii) cursor detection unit configured to detect presence of said cursor on the at least one associated viewing screen,
   iii) geographic determining unit linked to the format display unit and cursor detection unit and configured to determine current geographic position of the cursor on the at least one associated viewing screen upon the format display unit determining the display format of the at least one associated viewing screen is in a navigation format and upon the cursor detection unit detecting the presence of said cursor on the at least one associated viewing screen, wherein the current geographic position of the cursor is determined as latitude and longitude of the geographic position designated by the cursor on the at least one associated viewing screen displaying the navigation format,
   iv) data transmission link that links the geographic determining unit to the data transmission network, wherein the data transmission link is configured for transmitting the current geographic position determined by the geographic determining unit to the plurality of display devices of the display system, and
   v) display unit configured to display, upon activation, at least one characteristic symbol indicating the determined current geographic position of the cursor, wherein the display unit displays the at least one characteristic symbol to all of the viewing screens of the display devices in which: i) the presence of the cursor is not detected and ii) the navigation format is displayed.

2. The system as claimed in claim 1, wherein a plurality of said display devices are part of a first set, and each display unit of said display devices is activated automatically, on receiving a current geographic position relating to the presence of the cursor on another viewing screen of said first set, and displays automatically, on the associated viewing screen, a first symbol as the characteristic symbol.

3. The system as claimed in claim 1, wherein a portion of said plurality of display devices is part of a first set, a different portion of said plurality of display devices is part of a second set, and each display device of the first set and the second set also comprises a manual controller which enables a pilot to manually control the activation of the corresponding display unit to display a second characteristic symbol illustrating the position of the cursor.

4. The system as claimed in claim 3, further comprising at least two cursor management units, a first of which is used to manage a first cursor for said first set of display devices, and the second of which is used to manage a second cursor for said second set of display devices.

5. The system as claimed in claim 3, wherein said characteristic symbols are displayed using different graphic representations.

6. An aircraft, comprising the display system of claim 1.

* * * * *